United States Patent
Bos et al.

(10) Patent No.: US 10,545,344 B2
(45) Date of Patent: Jan. 28, 2020

(54) STEREOSCOPIC DISPLAY WITH REDUCED ACCOMMODATION FATIQUE

(71) Applicants: Kent State University, Kent, OH (US); Intel Corporation, Santa Clara, CA (US)

(72) Inventors: Philip Bos, Hudson, OH (US); Afsoon Jamali, Shaker Heights, OH (US); Anders Grunnet-Jepson, San Jose, CA (US); Achintya K. Bhowmik, Santa Clara, CA (US)

(73) Assignee: Kent State University, Kent, OH (US)

( * ) Notice: Subject to any disclaimer, the term of this patent is extended or adjusted under 35 U.S.C. 154(b) by 270 days.

(21) Appl. No.: 15/599,828

(22) Filed: May 19, 2017

(65) Prior Publication Data

US 2017/0336638 A1 Nov. 23, 2017

Related U.S. Application Data

(60) Provisional application No. 62/339,296, filed on May 20, 2016.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *A63F 2300/8082* (2013.01); *G02B 2027/0134* (2013.01)

(58) Field of Classification Search
CPC ............ G02B 27/0172; G02B 27/0093; G02B 2027/0134; G02B 2027/0138; G02B 2027/0187; A63F 2300/8082

(Continued)

(56) References Cited

U.S. PATENT DOCUMENTS 7,742,623 B1 * 6/2010 Moon ................ G06K 9/00604
382/103
2007/0043466 A1 * 2/2007 Vesely ................... G02B 5/201
700/166

(Continued)

OTHER PUBLICATIONS

Xiao, Xiao et al., *Advances in three-dimensional integral imaging: sensing, display, and applications* [*Invited*], Applied Optics, pp. 546-560, vol. 52, No. 4, Jan. 2013.

(Continued)

*Primary Examiner* — William C Vaughn, Jr.
*Assistant Examiner* — Jae N Noh
(74) *Attorney, Agent, or Firm* — Fay Sharpe LLP (57) ABSTRACT

A stereoscopic display device is provided for displaying a three-dimensional (3D) image as viewed by eyes consisting of a left eye and a right eye. In the display device, a single display screen, or separate left and right display screens, present a left image to the left eye but not the right eye, and present a right image to the right eye but not the left eye. A gaze distance tracker is configured to track gaze distance of the eyes. Variable-power lenses include a left variable-power lens arranged to provide eye accommodation for the left eye, and a right variable-power lens arranged to provide eye accommodation for the right eye. An electronic eye accommodation controller is configured to control the power of the variable power lenses to allow the image from the display to be focused on the retina, while the biological eye lens is accommodated to the gaze distance.

23 Claims, 6 Drawing Sheets

(58) Field of Classification Search
USPC .......................................................... 348/53
See application file for complete search history.

(56) References Cited

U.S. PATENT DOCUMENTS

| | | | | |
|---|---|---|---|---|
| 2013/0050432 | A1* | 2/2013 | Perez | G02B 27/017 348/47 |
| 2014/0347456 | A1* | 11/2014 | Kato | G02B 27/0093 348/59 |
| 2018/0003972 | A1* | 1/2018 | Kress | G02B 27/0172 |

OTHER PUBLICATIONS

Love, Gordon D., et al., *High-speed switchable lens enables the development of a volumetric stereoscopic display*, Optical Society of America, Optics Express, vol. 17, No. 18, Aug. 2009.

Hua, Hong et al., *A 3D integral imaging optical see-through head-mounted display*, Optical Society of America, Optics Express, vol. 22, No. 11, May 2014.

Huang, Fu-Chung et al., *The Light Field Stereoscope—Immersive Computer Graphics via Factored Near-Eye Light Field Displays with Focus Cues*, Journal—ACM Transactions on Graphics (TOG) TOG Homepage, vol. 34 Issue 4, Article No. 60, Aug. 2015.

Shibata, Takashi, *Stereoscopic 3-D display with optical correction for the reduction of the discrepancy between accommodation and convergence*, Journal of the SID 13/8, 2005; (*article submitted herewith is a revised version of a paper presented at the 11th International Display Workshops(IDW '04) held Dec. 8-10, 2004, in Niigata, Japan*).

Li, Liwui et al., *3.3: Design and Modeling of a Refractgive Liquid Crystal Lens for Tunable Optical Correction in 3-D Stereoscopic Displays*, SID 11 Digest 2011.

Bos, Karen J., *Reducing the accommodation and convergence difference in stereoscopic three-dimensional displays by using correction lenses*, Opt. Eng. 37(3) pp. 1078-1080, Mar. 1998.

\* cited by examiner

STEREOSCOPIC DISPLAY WITH REDUCED ACCOMMODATION FATIQUE

This application claims the benefit of U.S. Provisional Application No. 62/339,296 filed May 20, 2016 and titled "Stereoscopic Display With Reduced Accommodation Feature". U.S. Provisional Application No. 62/339,296 filed May 20, 2016 and titled "Stereoscopic Display With Reduced Accommodation Feature" is hereby incorporated by reference in its entirety into the specification of this application.

BACKGROUND

The following relates to the stereoscopic display arts, virtual reality arts, augmented reality arts, three-dimensional (3D) television or 3D movie arts, and related arts.

Stereoscopic display devices provide a three-dimensional (3D) view by presenting different left and right images to the left and right eyes, respectively. The left/right images correspond to the difference in vantage point due to a (typical) spacing distance between the left and right eyes, and thus the brain processes the left and right images viewed by the left and right eyes, respectively, into a perceived 3D image.

One type of stereoscopic display device, commonly referred to as a head-mounted display device, is in the form of head-mounted gear with physically separate left and right images presented on a display screen or screens, presenting left and right images to the left and right eyes, respectively. The two images are placed close to the respective eyes in order to provide a compact head-mounted display. As the human eye cannot focus too close to the eye (i.e., there is a minimum gaze distance for focusing), the head-mounted stereoscopic display device usually includes eye accommodation lenses interposed between each eye and its screen that provides eye accommodation to an apparent display distance, e.g. on the order of 1.5 meters in some designs. Head-mounted stereoscopic display devices are commonly used in stereoscopic display applications such as immersive virtual reality (VR) headsets or augmented reality (AR) glasses that project 3D images onto the wearer's view of the world.

In another type of stereoscopic display device, the two individual eye side-by-side images are replaced by a larger single screen, such as a television screen, that is simultaneously viewed by both the left and right eyes. This single screen is designed to output the left and right images with different optical polarizations, e.g. the left image may be shown on the screen with left-circular polarization (LCP) while the right image may be shown on the screen with right-circular polarization (RCP). The left and right image frames may be output time sequentially at a "frame rate" greater than the visual response time, e.g. 25-30 frames per second or faster. The viewer wears glasses with appropriate (mutually orthogonal) circular polarizers for the left eye and the right eye, so that the left eye views only the LCP left image while the right eye views only the RCP right image. In an alternative design, polarization-based eye selection is replaced by high-speed optical shutters built into the glasses worn by the viewer and synchronized with the sequential left/right frames displayed by the screen. In these types of stereoscopic display devices, eye accommodation lenses may not be needed due to the larger viewing distance of the single screen. This type of stereoscopic display device may be used in 3D television or movie theaters.

However, a problem arises in such stereoscopic display devices as pertains to gaze distance. As the viewer gazes at various objects shown by the stereoscopic display device, the eyes automatically attempt to focus at the appropriate apparent distance of the object in the perceived 3D space. (This is appropriate function in the real world, where the eyes naturally focus at the gaze point.) However, the left and right images being viewed by the respective left and right eyes (and which the brain perceives as the stereoscopic 3D image) are not actually at that apparent gaze distance; rather, the left and right images are actually at the display screen distance (or at the apparent display screen distance, in the case of a head-mounted stereoscopic display device with eye accommodation lenses). If the eyes focus at the apparent distance of the object then the actually viewed left and right images become defocused, causing blurriness or other visual distortion. In some physiological vision models, it is believed that the actual behavior is more complex, e.g. the eyeballs rotate to the perceived distance but the eye lenses attempt to focus to produce sharp edges in the focused image. The overall effect is unnatural viewing that can cause eyestrain and general feelings of discomfort.

BRIEF SUMMARY

In some illustrative embodiments disclosed herein, a stereoscopic display device is provided for displaying a three-dimensional (3D) image as viewed by eyes consisting of a left eye and a right eye. The stereoscopic display device comprises: a display screen configured to present a left image to the left eye but not the right eye and a right image to the right eye but not the left eye; a gaze distance tracker configured to track gaze distance of the eyes; variable-power lenses including a left variable-power lens arranged to provide eye accommodation for the left eye and a right variable-power lens arranged to provide eye accommodation for the right eye; and an electronic variable power accommodation lens controller configured to control the power of the variable power lenses to focus the left and right images on the retinas of the respective left and right eyes when the eyes gaze at the gaze distance tracked by the gaze distance tracker.

In some illustrative embodiments disclosed herein, a stereoscopic display device is provided for displaying a 3D image as viewed by eyes consisting of a left eye and a right eye. The stereoscopic display device comprises: a left display screen or screen portion positioned at a display distance from the left eye to present a left image to the left eye but not to the right eye; a right display screen or screen portion positioned at the display distance from the right eye to present a right image to the right eye but not to the left eye; a gaze distance tracker including eye trackers and configured to track the gaze distance of the eyes based at least in part on measurements of the eyes by the eye trackers; variable-power lenses including a left variable-power lens arranged to provide eye accommodation for the left eye and a right variable-power lens arranged to provide eye accommodation for the right eye; and an electronic variable-power accommodation lens controller configured to control the power of the variable power lenses according to $$D_{acc}(t) = \frac{1}{TDD} - \frac{1}{AOD(t)}$$

where $D_{acc}(t)$ is the power of the variable-power lenses in diopters set by the electronic variable-power accommodation lens controller as a function of time t, TDD is the distance between the respective left and right display screens or screen portions and the respective left and right eyes in meters, and AOD(t) is the gaze distance tracked by the gaze distance tracker as a function of time t in meters.

In some illustrative embodiments, a stereoscopic display method is disclosed for displaying a 3D image as viewed by eyes consisting of a left eye and a right eye. The stereoscopic display method comprises: presenting a left image to the left eye but not the right eye; presenting a right image to the right eye but not the left eye; tracking gaze distance of the eyes; and controlling variable-power lenses including a left variable-power lens arranged to provide eye accommodation for the left eye and a right variable-power lens arranged to provide eye accommodation for the right eye with the power of the variable-power lenses being set based on the tracked gaze distance and a display distance between the image and the eye in the presenting operations.

In some illustrative embodiments, a stereoscopic display device comprises a display screen configured to display a 3D image, a gaze distance tracker configured to track gaze distance of eyes viewing the display screen, a variable-power lens arranged to provide eye accommodation for the eyes viewing the display screen, and an electronic variable-power accommodation lens controller configured to control the power of the variable power lens based on the tracked gaze distance.

DETAILED DESCRIPTION

Figure 1:
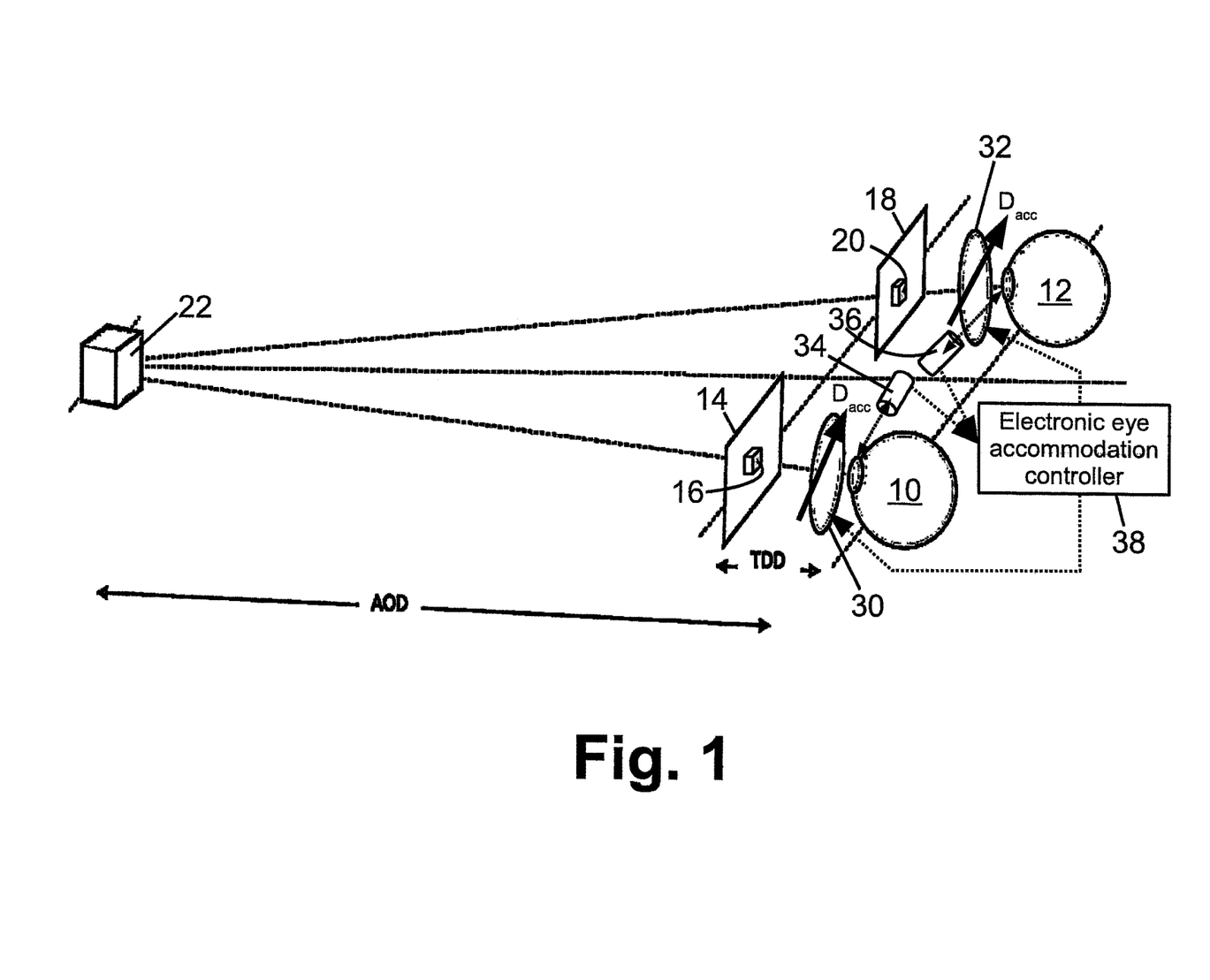
FIG. 1 diagrammatically shows a stereoscopic display device including eye accommodation as disclosed herein.

With reference to FIG. 1, a stereoscopic display device is illustrated for displaying a three-dimensional (3D) image as viewed by eyes consisting of a left eye 10 and a right eye 12. A left display screen 14 is configured to present a left image 16 to the left eye 10, but not to the right eye. Likewise, a right display screen 18 is arranged to present a right image 20 to the right eye 12, but not to the left eye. The left image 16 and the right image 20 are generally of the same scene but viewed from the different vantages provided by the separation of a typical set of left and right eyes; accordingly, as is known in the stereoscopic display arts such left and right images 16, 20 are perceived by the human viewer as a single 3D scene. For simplicity of description, the "scene" in illustrative FIG. 1 consists of a single box-like object, so that the human viewer viewing the stereoscopic display of FIG. 1 using the eyes 10, 12 perceives a single box-like object 22 at some distance denoted as the "Apparent Object Distance" or AOD in FIG. 1. The embodiment of FIG. 1 assumes that the left display screen 14 is placed sufficiently close to the left eye 10 so that its position ensures that the left display screen 14 is viewable by the left eye 10 but not the right eye; and likewise assumes that the right display screen 18 is placed sufficiently close to the right eye 12 so that its position ensures that the right display screen 18 is viewable by the right eye 12 but not the left eye. Such an arrangement of left and right display screens 14, 18 is common, for example, in a head-mounted stereoscopic display device such as an immersive virtual reality (VR) headset or in augmented reality (AR) eyeglasses. In some embodiments, the left and right display screens 14, 18 may be physically embodied by a single "long" display screen that includes a left display screen portion 14 that displays the left image 16 viewable by the left eye 10 but not the right eye, and a right display screen portion 18 that displays the right image 20 viewable by the right eye 12 but not the left eye.

The stereoscopic display device of FIG. 1 further includes a left variable-power lens 30 to provide eye accommodation for the left eye 10, and likewise includes a right variable-power lens 32 to provide eye accommodation for the right eye 12. In a conventional head-mounted stereoscopic display device, due to the close proximity of the left and right display screens to the respective left and right eyes, left-eye and right-eye fixed-power lenses are typically provided in roughly the same position as the variable-power lenses 30, 32, and the fixed-power lenses provide eye accommodation to a comfortable distance at which the eyes can focus. For example, in a typical VR headset or AR glasses the left and right screens may be a few millimeters to at most a few tens of millimeters away from the respective eyes—as this distance is too close for the eyes to focus the conventional fixed-power lenses provide eye accommodation to a comfortable distance of, e.g. one or two meters to a few meters. However, if the gaze distance of the viewer viewing the 3D image (e.g. a gaze distance of AOD if viewing the 3D object 22 of FIG. 1) is sufficiently different from the eye accommodation distance provided by the fixed-power eye accommodation lenses, then the left and right images shown on the left and right display screens will not be in focus for the viewer, even with the eye accommodation provided by the fixed-power lenses. The viewer does not recognize the problem because the viewer does not perceive the component left and right images, but rather perceives only the 3D image produced by visual processing of the left and right images performed by the viewer's brain. Instead, the viewer perceives an unnatural viewing experience, e.g. blurriness and/or spatial distortion, which can lead to eyestrain and general feelings of discomfort.

In the improved stereoscopic display device of FIG. 1, these problems are remediated by replacing the conventional fixed-power eye accommodation lenses by the illustrated variable-power lenses 30, 32. Additionally, the stereoscopic display device of FIG. 1 includes a left eye tracker 34, a right eye tracker 36, and an electronic eye accommodation controller 38 (which includes a gaze tracker component that uses pupil or eyeball position data collected by the eye trackers 34, 36 to track gaze distance). Note that these components 34, 38 are diagrammatically depicted in FIG. 1; and moreover they may be variously integrated. For example, in one contemplated embodiment the components 34, 38 include optical eye tracking devices such as eye tracking devices available from EyeFluence (Milpitas, Calif., USA) or SensoMotoric Instruments GmbH (Teltow, Germany). In some suitable embodiments, the eye trackers 34, 36 measure pupil positions, and an electronic microprocessor or microcontroller is programmed to implement the electronic eye accommodation controller 38 by estimating the gaze distance from the pupil positions (and optionally also from information about the 3D image at the estimated gaze location) and controlling the power of the variable-power lenses 30, 32 based on the estimated gaze distance. In some embodiments, a single electronic processor may be programmed to both process raw eye tracking data acquired by the eye trackers 34, 36 to determine pupil positions and to perform the gaze distance estimation and determination of lens power (i.e. implement the controller 38); alternatively, in other embodiments the eye trackers 34, 36 may be self-contained with dedicated processor(s) separate from the microprocessor or microcontroller implementing the eye accommodation controller 38. As described further herein with reference to FIG. 3, the gaze distance is related to the position of the pupils because the eyes are each rotated to point toward the object being gazed at, and so the distance between the pupils can be used to determine the gaze distance. (It is noted that, as used herein, the term "power" refers to optical power of the variable-power lenses 30, 32, e.g. suitably measured in diopters).

The gaze distance tracker 34 is configured to track gaze distance of the eyes 10, 12. In illustrative FIG. 1, it is assumed that the gaze distance is the distance AOD indicated in FIG. 1, as appropriate for the illustrative example of the viewer looking at the 3D object 22. To generalize, wherever the notation "AOD" is used herein, the term "gaze distance" can be substituted.

In order for the eyes 10, 12 to perceive the 3D image in-focus, the eyes should be focused at the respective display screens 14, 18, which are at a display distance denoted herein as the "true display distance" or TDD. However, the eyes are naturally focused at the gaze distance. So for a natural 3D viewing experience the eyes should be accommodated for the distance AOD. Then the desired power of the (biological) eye lens is:

$$D_e = \frac{1}{AOD} \quad (1)$$

where $D_e$ is the optical power of the (biological) eye lens in diopters when AOD is measured in meters. Equation (1) follows because when the viewer is looking at the object 22 the biological eye lenses of the eyes 10, 12 are desired to be focused at the distance AOD (i.e. at the gaze distance), and the optical power in diopters is by definition the reciprocal of the focal length in meters. If the optical power of the variable power accommodation lenses 30, 32 in diopters is denoted as $D_{acc}$, and assuming under a thin lens approximation that the powers of the biological eye lens and the eye accommodation lens are additive, then the power of the variable power accommodation lens to bring the display screens 14, 18 at distance TDD from the eyes into focus is given by:

$$D_e + D_{acc} = \frac{1}{TDD} \quad (2)$$

Inserting Equation (1) into Equation (2) (that is, setting $D_e$ to the inverse of the gaze distance AOD) yields:

$$\frac{1}{AOD} + D_{acc} = \frac{1}{TDD} \quad (3)$$

and by simple rearrangement the power of the variable power accommodation lens is obtained that will allow for both the image presented by the display to be in sharp focus on the retina; and allow for the biological eye lens to be accommodated at the gaze distance:

$$D_{acc}(t) = \frac{1}{TDD} - \frac{1}{AOD(t)} \quad (4)$$

Thus, using the gaze distance (AOD) computed by the electronic eye accommodation controller 38 from the pupil positions tracked by the eye trackers 34, 36 (and optionally further based on 3D display content of the stereoscopic image), and with further knowledge of the true display distance (TDD) of the display screens 14, 18 from the respective eyes 10, 12, the electronic variable power accommodation lens controller 38 can apply Equation (4) to compute the appropriate power $D_{acc}$ to accommodate the tracked gaze distance. In Equation (4), the notation t denotes time, so that AOD(t) is the gaze distance as a function of time (since the tracking performed by the gaze distance tracker 34 is dynamic) and correspondingly the computed eye accommodation $D_{acc}(t)$ will in general change as a function of time as the viewer may vary the gaze distance.

Figure 1A:
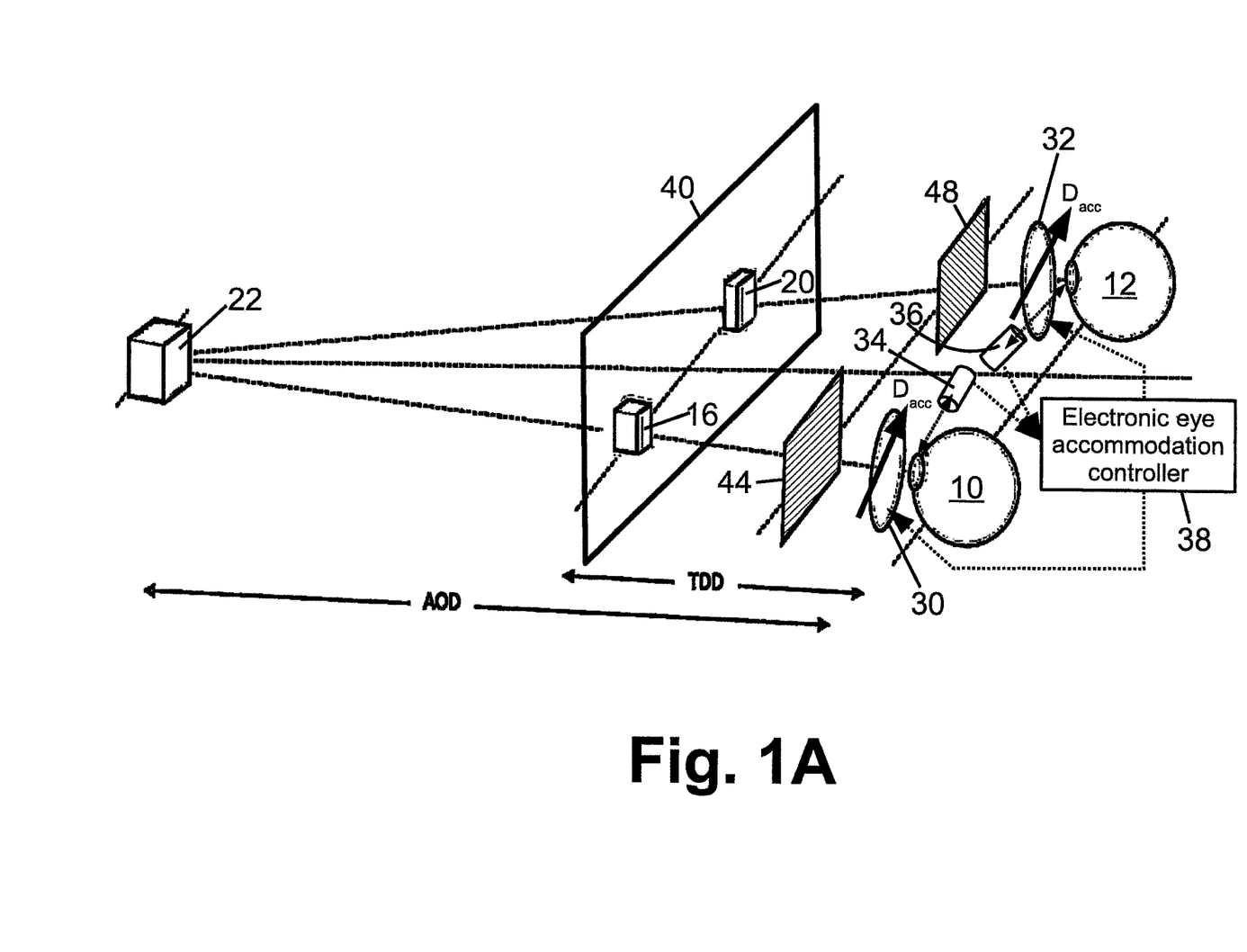
FIG. 1A diagrammatically shows a variant stereoscopic display device including eye accommodation as disclosed herein, which employs a single display screen.

With reference to FIG. 1A, the disclosed approach employing variable-power lenses 30, 32 controlled by the electronic variable power accommodation lens controller 38 based on tracked gaze distance provided by the eye trackers 34, 36 is also readily employed in other types of stereoscopic display devices. In the embodiment of FIG. 1A, like reference numbers as in FIG. 1 indicate corresponding components. In the stereoscopic display device of FIG. 1A, the left and right display screens 14, 18 located close to the respective eyes 10, 12 (e.g. within millimeters or tens of millimeters) are replaced by a single display screen 40 located further away, e.g. at a typical distance of a television screen in some embodiments (e.g. a meter to a few meters away). This single display screen 40 displays both the left image 16 and the right image 20, for example using time-domain multiplexing at a "frame rate" greater than the visual response time, e.g. 25-30 frames per second or faster. It may be noted that in such embodiments, e.g. used for 3D television or 3D theater, no fixed-power eye accommodation lenses are typically used since the single screen is located far enough away that the eyes can focus on the screen without eye accommodation. In the embodiment of FIG. 1A, devices 44, 48 are provided for the left eye 10 and the right eye 12, respectively, to ensure that each eye views only its appropriate image. Thus, the device 44 prevents the left eye from viewing the display of the right image 20 on the display screen 40, while the device 48 prevents the right eye from viewing the display of the left image 16 on the display screen 40. In some suitable embodiments, the viewer wears eyeglasses carrying the device 40 in the left ocular of the eyeglasses and the device 48 in the right ocular of the eyeglasses. The devices 40, 48 can take various forms.

In a passive eyeglasses embodiment, the devices 40, 48 are optical polarizers, and the display screen 40 is designed to display the left image 16 with a first polarization and the right image 20 with a second polarization that is orthogonal to the first polarization. For example, the left eye device 40 may be a polarizer that passes only left-circularly polarized light, while the right eye device 48 may be a polarizer that passes only right-circularly polarized (RCP) light. In this example, the display screen 40 displays the left image 16 with LCP light and the right image 20 with RCP light.

In an alternative design, the devices 40, 48 are shutters, such as liquid crystal (LC) devices that are electronically switched between transparent and opaque settings. In this case, operation of the shutter devices 40, 48 is synchronized with the time-domain multiplexed display of the left and right images so that the right shutter 48 is opaque when the left image 14 is displayed and the left shutter 40 is opaque when the right image 20 is displayed. These are merely illustrative examples.

In the embodiment of FIG. 1A, the display distance (i.e. the true display distance, TDD) is much larger than in the embodiment of FIG. 1. Nonetheless, the goal is the same—as the tracked gaze distance AOD(t) varies the eyes should remain focused on the display screen 40 at the display distance TDD, and this is achieved by applying Equation (4) to determine the appropriate power $D_{acc}(t)$ of the variable-power lenses 30, 32.

It should be noted that in either the embodiment of FIG. 1 or the embodiment of FIG. 1A, the variable-power accommodation lenses 30, 32 may be compound lenses. For example, each variable power accommodation lens may be a combination of a fixed lens with a fixed power and a variable power lens that together with the fixed lens provides the desired power range, e.g. a range 1-2 diopter range in some embodiments. For example, in the embodiment of FIG. 1 where TDD is very small, e.g. millimeters to tens of millimeters, it may be preferable to employ a fixed-power lens focusing on the display screen 14 (or display screen 18) so as to provide the fixed 1/TDD power component of Equation (4) (or something close to that power) together with a variable power lens that provides the additional variable power component 1/AOD(t).

Figure 2:
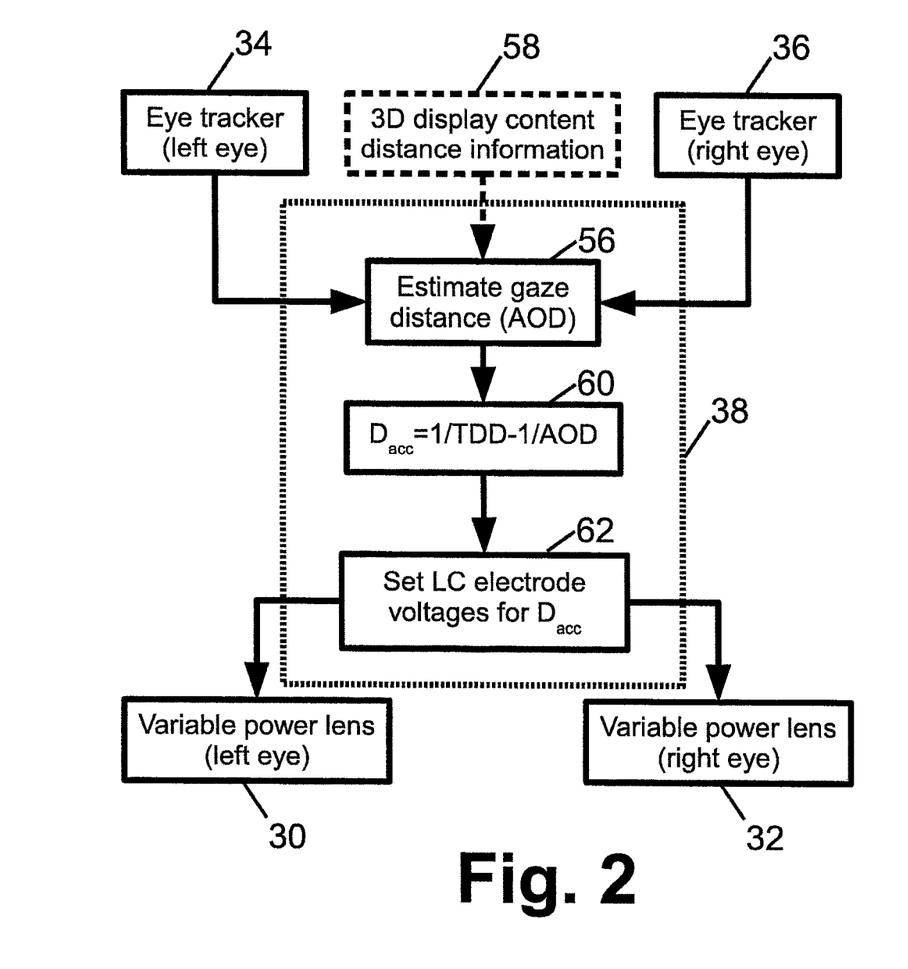
FIG. 2 diagrammatically shows the electronic eye accommodation controller and gaze distance tracker of the stereoscopic display of FIG. 1 or of FIG. 1A.
Figure 3:
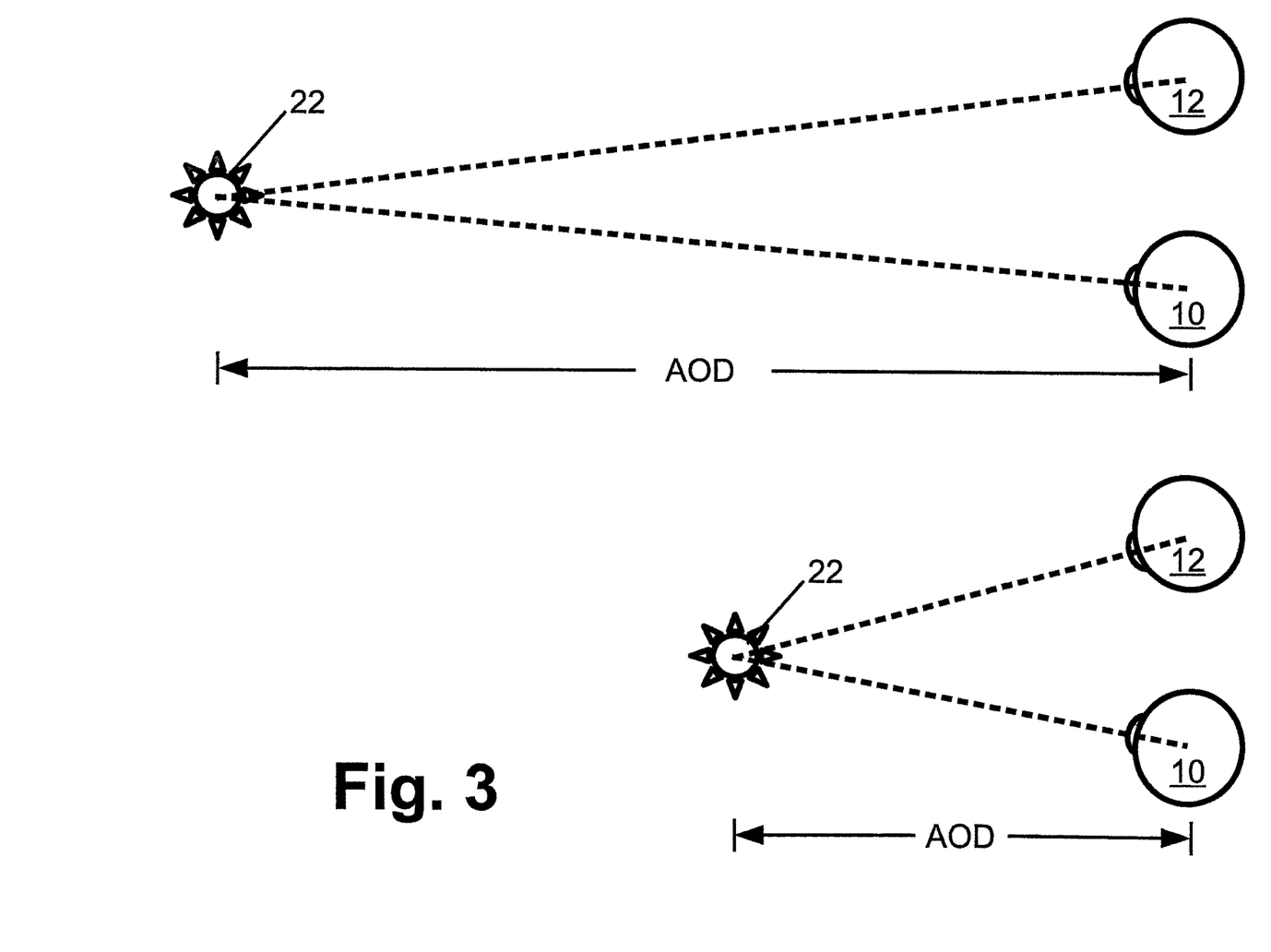
FIG. 3 diagrammatically shows the relationship between gaze distance and pupil position, which is suitably leveraged by the electronic eye accommodation controller in tracking gaze distance.

With reference now to FIG. 2 and with brief reference to FIG. 3, an illustrative embodiment of the electronic eye accommodation controller 38 of the stereoscopic display of FIG. 1 or of FIG. 1A is described. The illustrative controller 38 of FIG. 2 receives input data from the left eye tracker 34 arranged to track the pupil of the left eye 10, and from the right eye tracker 36 arranged to track the pupil of the right eye 12. An electronic microprocessor or microcontroller is programmed to implement the gaze tracking function of the controller 38 by performing an operation 56 in which the gaze distance (AOD) is estimated from the eye tracking data. FIG. 3 diagrammatically illustrates how the gaze distance AOD can be estimated based on the "inward" tilt of the pupils of the eyes 10, 12—as the gaze distance AOD decreases the pupils tilt more inward. It may also be noted that the gaze is not necessarily straight ahead as shown in FIG. 3 (e.g., the gaze may be toward the left, or toward the right). However, such deviations do not impact the gaze distance, which is determined by the extent by which the pupils tilt toward each other. The approach shown in FIG. 3 may be used alone to estimate gaze distance (or, more generally, to rely upon eye measurements alone to estimate gaze distance using any suitable gaze tracking technology); however, accuracy may be limited by artifacts such as saccadic motion of the eyeballs. To increase accuracy, it is contemplated to leverage content 58 of the 3D display that is being shown by the stereoscopic display device. For example, if the eye trackers 34, 36 are used to track both the gaze direction and the gaze distance, then these define a particular location in the 3D space of the stereoscopic image. This location may be compared with the 3D content 58 of the stereoscopic (3D) image to estimate the feature of the displayed 3D image that the viewer is most likely to be looking at. The location of this feature in the displayed 3D image can then be used to more accurately refine the gaze distance.

In the illustrative embodiment of FIG. 2, the optical power control function of the electronic eye accommodation controller 38 is implemented by the electronic microprocessor or microcontroller being further programmed to perform an operation 60 in which Equation (4) is evaluated using the known display screen distance TDD and the estimated gaze distance AOD(t) to determine the appropriate power $D_{acc}$ to allow the image from the display to be focused on the retina, while the biological eye lens is accommodated to the distance AOD. Said another way, the operation 60 uses the known display screen distance TDD and the estimated gaze distance AOD(t) to calculate the power $D_{acc}$ for the variable power accommodation lenses 30, 32 to focus the image 16, 20 shown on the display screen(s) 14, 18 (or shown on the display screen 40) onto the retina of the respective eye 10, 12 when the eyes 10, 12 are focused at gaze distance AOD. To implement the optical power control function of the controller 38, the electronic microprocessor or microcontroller is further programmed to perform an operation 62 in which the appropriate control signal is determined for controlling the variable-power lenses 30, 32 to achieve the determined power $D_{acc}$. This control signal is then applied to both variable-power accommodation lenses 30, 32.

The variable-power accommodation lenses 30, 32 can be of any type providing sufficient power adjustment range and speed.

Figure 4:
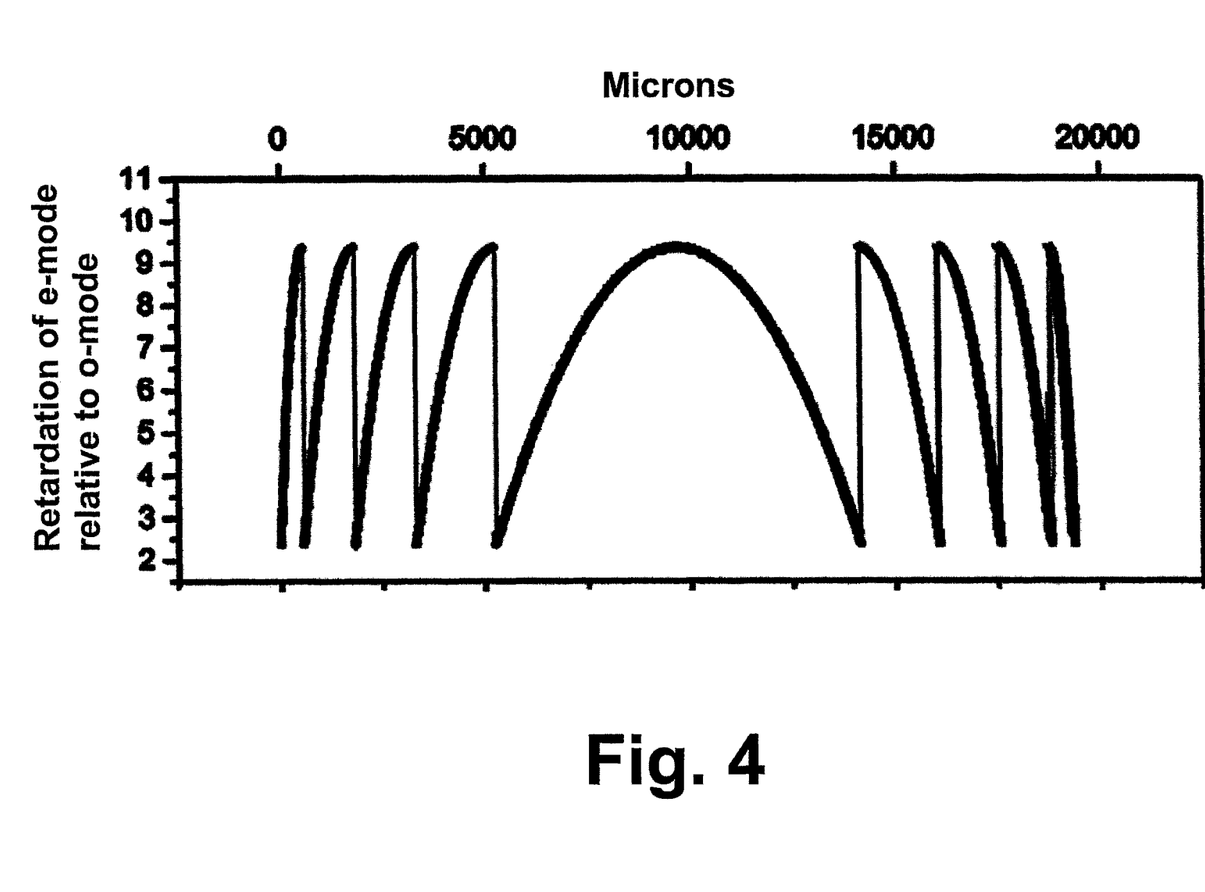
FIGS. 4 and 5 diagrammatically show some design parameters for designing a suitable embodiment of the variable power eye accommodation lenses of the stereoscopic display of FIGS. 1 and 2.
Figure 5:
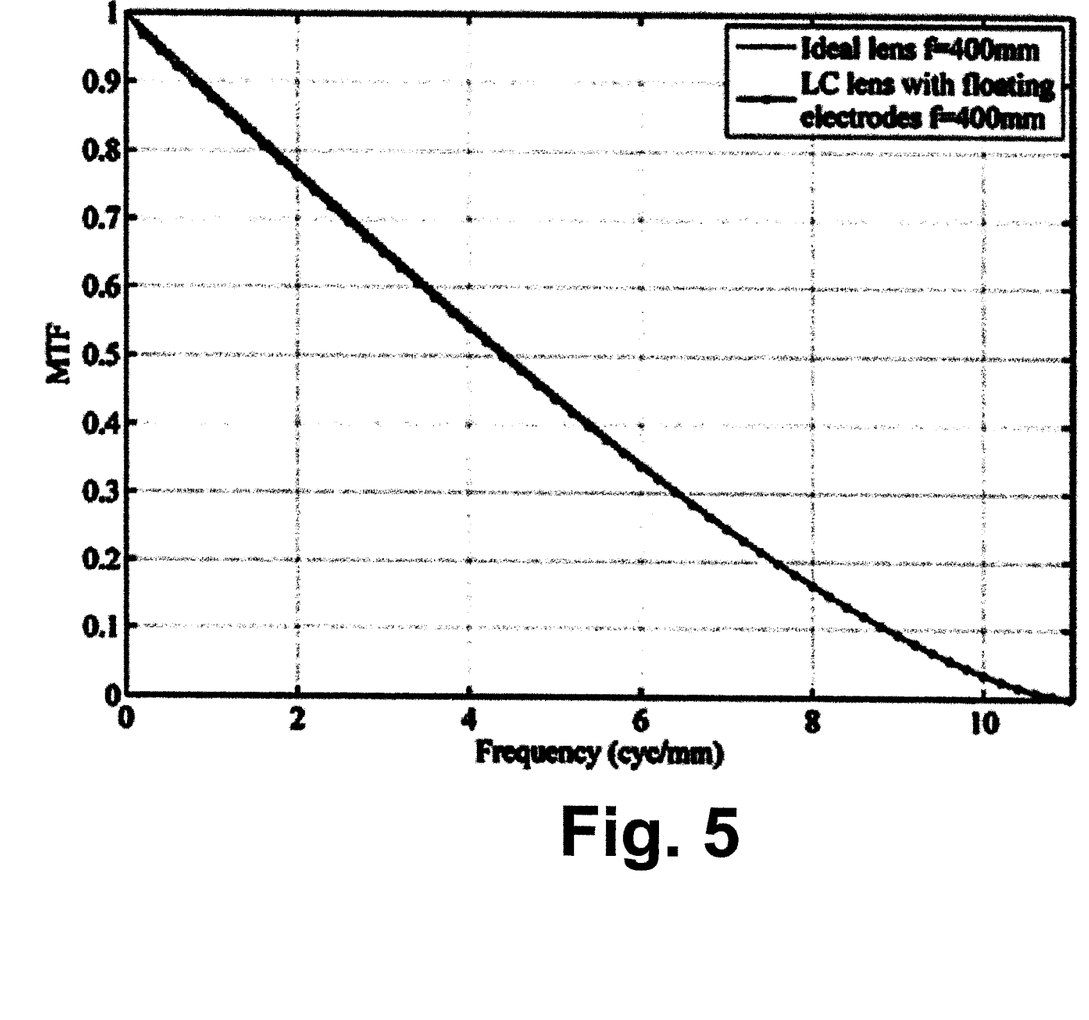

With reference to FIG. 4, in some embodiments the variable-power lenses 30, 32 are liquid crystal (LC) lenses such as those described in Li et al., "Liquid crystal lens with concentric electrodes and inter-electrode resistors," Liquid Crystal Reviews, 2, 130 (2014). In such a lens, the optical path difference (OPD), or Δnd (where Δn is the birefringence of the LC material and d is the thickness of the LC material), of the lens with a continuous phase profile is given by $r^2/2f$ (where r is the radius and f is the focal length), which yields an OPD of 37.5 microns for 1.5 diopter range and a lens of radius r=1 cm. FIG. 4 plots a calculated phase profile of such a 2 cm-diameter lens. In FIG. 4 the horizontal scale is in microns and the vertical scale is retardation of the e-mode relative to the o-mode of the liquid crystals For a smaller lens with r=1.2 mm, the OPD is only 0.45 microns. For an LC material with a birefringence of 0.27, this yields a single cell thickness of greater than 139 microns for the VR device, and only 1.7 microns for the AR device. A higher cell thickness of about 15 microns is estimated to be appropriate to achieve speed commensurate with human eye focusing speed (on the order of several hundred milliseconds to change by 1.5 diopter). Lenses of this type with the latter dimensions (r~1.2 mm) have been manufactured as reported in Li et al., supra. In the design of these lenses concentric electrodes were used that can have a defined potential applied to each one that controls the orientation of the liquid crystal and its relevant index of refraction through the following relationship:

$$n_{eff} = \frac{n_o n_e}{\sqrt{(n_o^2 \sin^2\theta + n_e^2 \cos^2\theta)}} \quad (5)$$

where $n_o$ and $n_e$ are the ordinary and extraordinary refractive indexes, respectively, of the birefringent LC material. The voltage applied to each ring is simplified by the fact that the voltage versus phase retardation dependence for a liquid crystal is almost linear over small ranges of voltage. The simplification comes by not needing to connect each ring electrode to an external voltage source because it can be considered that only one of about 10 electrode rings need to be connected to an outside source, with the electrodes between the externally connected ones being connected in series by internal resistors. FIG. 5 shows the numerically calculated modulation transfer function (MTF) of this lens design.

For a larger-diameter lens, such as the illustrative r=1 cm lens of FIG. 4, the variable lens design is more difficult because the larger diameter results in a larger OPD. If a single lens with a continuous profile is considered, as mentioned previously, its thickness would cause the response time of the device to be longer than optimal to track human eye gaze distance changes. One contemplated approach to address this problem is to use multiple cells (again, relying upon the additive nature of optical powers in a thin-film approximation). Another contemplated approach is to make each of these cells to have a Fresnel lens style design. It is expected based on Li et al., supra, that at least two cells will be employed to provide an acceptable angle of view.

The foregoing illustrative embodiments of the variable-power lenses 30, 32 are merely examples, and any variable-power lens with sufficient power range (e.g. 1-2 diopters in some embodiments) and switching speed (on the order of several hundred milliseconds to closely track human eye focusing speed) can be employed. For example, electromechanical variable power lenses are contemplated in which two or more lenses are arranged in an optical train with electromechanical actuators configured to adjust lens spacing(s) in the optical train to achieve variable power.

As previously noted, in some embodiments the power range of the variable-power lenses 30, 32 is 1-2 diopters. This relatively small range can be shown to be sufficient to provide effective eye accommodation as follows. From Equation (4), it can be seen that the optical power range needed is:

$$\Delta D_{acc} = \left(\frac{1}{TDD} - \frac{1}{AOD_{max}}\right) - \left(\frac{1}{TDD} - \frac{1}{AOD_{min}}\right) = \frac{1}{AOD_{min}} - \frac{1}{AOD_{max}} \quad (6)$$

where $AOD_{min}$ is the minimum gaze distance and $AOD_{max}$ is the maximum gaze distance. However, it has been shown (see Shibata et al., "Stereoscopic 3D display with optical correction for the reduction of the discrepancy between accommodation and convergence," Journal of the SID, 13, 665 (2005)) that a "zone of comfort" is obtained if the focus is within ±0.5 diopter of the gaze distance. (This is a rough value since it is a "measure" of subjective visual "comfort", but the salient point is that a relatively large error between the optical system focus and the gaze distance can be tolerated). Introducing this "allowable error" into the power range of Equation (6) yields a reduced power range design basis of:

$$\Delta D_{acc} = \frac{1}{AOD_{min}} - \frac{1}{AOD_{max}} - 1 \quad (7)$$

Using typical values of $AOD_{min}$ being 0.5 meters and $AOD_{max}$ being infinity, then the range of power of the VR lens for perfect accommodation is obtained using Equation (6) as:

$$\Delta D_{acc} = \frac{1}{AOD_{min}} - \frac{1}{AOD_{max}} = \frac{1}{0.5\,\text{m}} - \frac{1}{\infty} = 2 - 0 = 2 \text{ diopter} \quad (8)$$

Using the reduced range of Equation (7) then yields $\Delta D_{acc}=1$ diopter to stay within the "zone of comfort" of ±0.5 diopter.

In sum, if the gaze distance tracker 34 is used to determine the gaze distance AOD of the object 22 being viewed by the viewer, and range of AOD is limited to be from 0.5 meters to infinity, then the variable-power lenses 30, 32 only need to have a range of 2 diopter (using the more stringent condition of Equation (6)) or a range of 1 diopter (allowing for the "zone of comfort" as per Equation (7)).

An advantage of embodiments disclosed herein is that the accommodation components 30, 32, 34, 36, 38 operate independently of, and are not synchronized with, the presentation of the left and right images 16, 20 (except to the extent that in some optional variants the 3D display content 58 is used in tracking gaze distance). Accordingly, there is no need to modify operation of the stereoscopic display device beyond adding the eye trackers 34, 36 (if they are not already present for other purposes), the controller 38, and the variable-power lenses 30, 32. The accommodation components 30, 32, 34, 36, 38 do not adversely impact frame rate of the stereoscopic display.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A stereoscopic display device for displaying a three-dimensional (3D) image as viewed by eyes consisting of a left eye and a right eye, the stereoscopic display device comprising:
    a display screen configured to present a left image to the left eye but not the right eye and a right image to the right eye but not the left eye;
    a gaze distance tracker configured to track gaze distance of the eyes;
    variable-power lenses including a left variable-power lens arranged to provide eye accommodation for the left eye and a right variable-power lens arranged to provide eye accommodation for the right eye; and
    an electronic variable power accommodation lens controller configured to control the power of the variable-power lenses to focus the left and right images on the retinas of the respective left and right eyes when the eyes gaze at the gaze distance tracked by the gaze distance tracker;
    wherein the electronic variable power accommodation lens controller is configured to set the power of the variable power lenses to:

$$D_{acc}(t) = \frac{1}{TDD} - \frac{1}{AOD(t)}$$

where $D_{acc}(t)$ is the power of the variable-power lenses in diopters set by the electronic variable power accommodation lens controller as a function of time t, TDD is the distance between the display screen and the eyes in meters, and AOD(t) is the gaze distance tracked by the gaze distance tracker as a function of time t in meters.

2. The stereoscopic display device of claim 1 wherein the variable-power lenses are adjustable over a power range of 2 diopters or less.

3. The stereoscopic display device of claim 1 wherein the variable-power lenses have a power range of at least 1 diopter.

4. The stereoscopic display device of claim 1 wherein the gaze distance tracker includes:
a left eye tracker that tracks pupil position of the left eye;
a right eye tracker that tracks pupil position of the right eye; and
an electronic processor programmed to track the gaze distance of the eyes based only on pupil positions measured by the left and right eye trackers.

5. The stereoscopic display device of claim 1 wherein the gaze distance tracker includes:
a left eye tracker that tracks position of the left eye;
a right eye tracker that tracks position of the right eye; and
an electronic processor programmed to track the gaze distance of the eyes based only on measurements of the eye positions from the eye trackers and not based on content of the 3D image.

6. The stereoscopic display device of claim 1 wherein the gaze distance tracker includes:
a left eye tracker that tracks position of the left eye;
a right eye tracker that tracks position of the right eye; and
an electronic processor programmed to track the gaze distance of the eyes based on measurements of the eye positions from the eye trackers and content of the 3D image.

7. The stereoscopic display device of claim 1 wherein the display screen includes:
a left display screen or screen portion positioned to present the left image to the left eye but not to the right eye; and
a right display screen or screen portion positioned to present the right image to the right eye but not to the left eye.

8. The stereoscopic display device of claim 7 comprising a head-mounted stereoscopic display device.

9. The stereoscopic display device of claim 1 wherein the display screen includes:
a display screen viewable by both eyes;
a left optical selection element positioned to block the right image from reaching the left eye; and
a right optical selection element positioned to block the left image from reaching the right eye.

10. A stereoscopic display device for displaying a three-dimensional (3D) image as viewed by eyes consisting of a left eye and a right eye, the stereoscopic display device comprising:
a left display screen or screen portion positioned at a display distance from the left eye to present a left image to the left eye but not to the right eye;
a right display screen or screen portion positioned at the display distance from the right eye to present a right image to the right eye but not to the left eye;
a gaze distance tracker including eye trackers and configured to track the gaze distance of the eyes based at least in part on measurements of the eyes by the eye trackers;

variable-power lenses including a left variable-power lens arranged to provide eye accommodation for the left eye and a right variable-power lens arranged to provide eye accommodation for the right eye; and
an electronic variable-power accommodation lens controller configured to control the power of the variable-power lenses according to:

$$D_{acc}(t) = \frac{1}{TDD} - \frac{1}{AOD(t)}$$

where $D_{acc}(t)$ is the power of the variable-power lenses in diopters set by the electronic variable-power accommodation lens controller as a function of time t, TDD is the distance between the respective left and right display screens or screen portions and the respective left and right eyes in meters, and AOD(t) is the gaze distance tracked by the gaze distance tracker as a function of time t in meters.

11. The stereoscopic display device of claim 10 wherein the variable-power lenses are adjustable over a power range of between 1 diopter and 2 diopters inclusive.

12. The stereoscopic display device of claim 10 wherein the electronic variable-power accommodation lens controller operates independently of and not synchronized with the presentation of the left and right images.

13. A stereoscopic display method for displaying a three-dimensional (3D) image as viewed by eyes consisting of a left eye and a right eye, the stereoscopic display method comprising:
presenting a left image to the left eye but not the right eye using a display screen visible to the left eye;
presenting a right image to the right eye but not the left eye using a display screen visible to the right eye;
tracking gaze distance of the eyes; and
controlling variable-power lenses including a left variable-power lens interposed between the left eye and the display screen visible to the left eye to provide eye accommodation for the left eye and a right variable-power lens interposed between the right eye and the display screen visible to the right eye to provide eye accommodation for the right eye with the power of the variable-power lenses being set based on the tracked gaze distance and a display distance between the image and the eye in the presenting operations.

14. The stereoscopic display method of claim 13 wherein the controlling includes:
setting the power of the variable-power lenses to:

$$D_{acc}(t) = \frac{1}{TDD} - \frac{1}{AOD(t)}$$

where $D_{acc}(t)$ is the power of the variable-power lenses in diopters as a function of time t, TDD is the display distance in meters, and AOD(t) is the tracked gaze distance as a function of time t in meters.

15. The stereoscopic display method of claim 13 wherein the tracking of the gaze distance of the eyes is based only on measurements of the eyes and not based on content of the 3D image.

16. The stereoscopic display method of claim 13 wherein the tracking of the gaze distance of the eyes is based on measurements of the eyes and content of the 3D image.

17. The stereoscopic display method of claim 13 wherein:
the presenting of the left image employs a left display screen or screen portion positioned to present the left image to the left eye but not to the right eye; and
the presenting of the right image employs a right display screen or screen portion positioned to present the right image to the right eye but not to the left eye.

18. The stereoscopic display method of claim 13 wherein the presenting operations employ a display screen viewable by both eyes and wherein:
the presenting of the left image to the left eye but not the right eye includes blocking the left image from being viewed by the right eye using a shutter or polarizer; and
the presenting of the right image to the right eye but not the left eye includes blocking the right image from being viewed by the left eye using a shutter or polarizer.

19. A stereoscopic display device comprising:
a display screen configured to display a three-dimensional (3D) image;
a gaze distance tracker configured to track gaze distance of eyes viewing the display screen;
a variable-power lens arranged to provide eye accommodation for the eyes viewing the display screen; and
an electronic variable-power accommodation lens controller configured to control the power of the variable-power lens to set the power of the variable power lens based on inputs consisting of (1) the distance between the display screen and the eyes, and (2) the gaze distance tracked by the gaze distance tracker.

20. The stereoscopic display device of claim 19 wherein the variable-power lens is adjustable over a power range of between 1 diopter and 2 diopters inclusive.

21. The stereoscopic display device of claim 19 wherein the electronic variable-power accommodation lens controller is configured to set the power of the variable-power lens to:

$$D_{acc}(t) = \frac{1}{TDD} + \frac{1}{AOD(t)}$$

where $D_{acc}(t)$ is the power of the variable-power lens in diopters set by the electronic variable-power accommodation lens controller as a function of time t, TDD is the distance between the display screen and the eyes in meters, and AOD(t) is the gaze distance tracked by the gaze distance tracker as a function of time t in meters.

22. The stereoscopic display device of claim 19 wherein the gaze distance tracker tracks the gaze distance of the eyes based only on measurements of the eyes and not based on content of the 3D image.

23. The stereoscopic display device of claim 19 wherein:
the display screen includes a left display screen or screen portion viewable only by the left eye and a right display screen or screen portion viewable only by the right eye; and
the variable-power lens includes a left variable-power lens arranged to provide eye accommodation for the left eye viewing the left display screen or screen portion and a right variable-power lens arranged to provide eye accommodation for the right eye viewing the right display screen or screen portion.

* * * * *